Oct. 2, 1945.  F. NALLINGER ET AL  2,385,834
LIQUID CLUTCH TRANSMISSION
Filed March 18, 1938   3 Sheets-Sheet 1

Inventors
Fritz Nallinger,
Arthur Berger,
By Alle Holcombe
Attorneys

Inventors
Fritz Nallinger,
Arthur Berger,

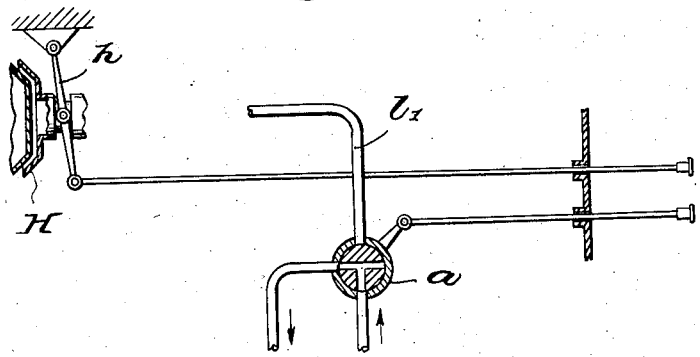
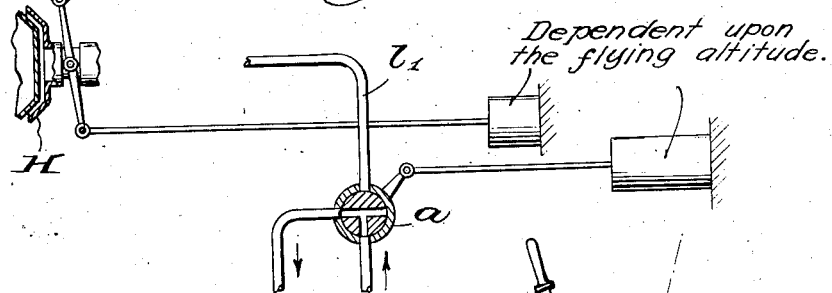
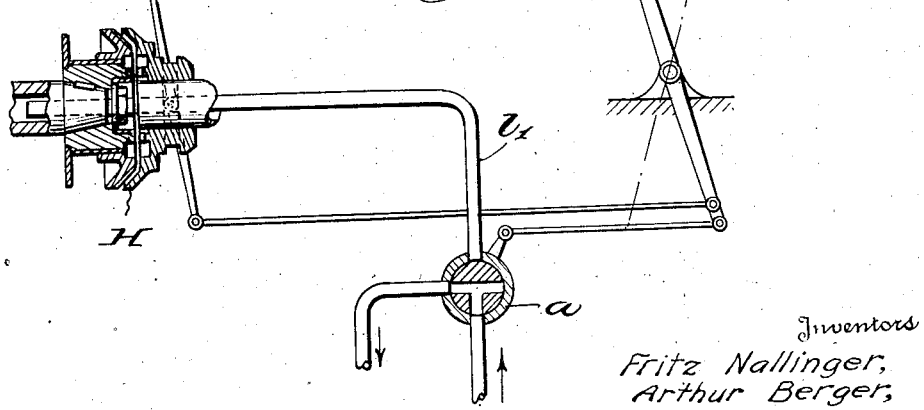

Patented Oct. 2, 1945

2,385,834

UNITED STATES PATENT OFFICE 2,385,834

LIQUID CLUTCH TRANSMISSION

Fritz Nallinger, Stuttgart, and Arthur Berger, Stuttgart-Oberturkheim, Germany; vested in the Alien Property Custodian Application March 18, 1938, Serial No. 196,718
In Germany January 15, 1936

6 Claims. (Cl. 74—189.5)

The invention relates to an apparatus for the actuation of liquid clutches. In the driving of blowers or other high speed machines by means of a controllable liquid clutch, a comparatively high torque is transmitted, even with the clutch emptied of liquid or otherwise controlled for idle running, due to the circulation of liquid or air still present therein. Thus, for example, experiments upon an internal combustion engine with a charging blower have shown that, with a driving speed of about 25,000 revolutions per minute, air friction alone in the emptied clutch is capable of entraining the blower runner at approximately 5,000 revolutions per minute. Consequently, apart from the loss of power thereby caused, considerable heat is evolved in the idly running clutch, which may lead to trouble.

This invention seeks to obviate these disadvantages and to prevent practically any transmission of power by an idly running liquid clutch. For this purpose, the invention provides for the disconnection of the said clutch either from the drive or from the high speed machine, so that when the machine is to be driven, first the liquid clutch is coupled up, preferably, after previous synchronisation of the parts to be coupled, and is then controlled for increase of output, as by filling it with liquid.

According to one suitable arrangement, the auxiliary clutch serving for the connection or dis-connection of the liquid clutch is preferably constructed as a claw clutch, and is connected to a synchronising device which comes into operation before the engagement of the claw elements.

Another arrangement comprises a planetary gearing under control of a brake for connecting and dis-connecting the liquid clutch. A very simple construction results from the use of such a planetary gearing, and high reliability of operation from the gentle engagement achieved therewith. By gradually increasing the braking pressure upon the control member of the planetary gearing, the full connection of the liquid clutch may be delayed as desired, so that any shock is avoided. Also the speed of the blower can be temporarily reduced by partial release of the brake without it being necessary to change the filling of the liquid clutch. At the same time, with the planetary gearing, a separate transmission, for example step-up transmission, becomes superfluous.

In order to enable the invention to be readily understood, reference is made to the accompanying drawings illustrating three different arrangements by way of example, in which drawings:

Fig. 5 shows the arrangement of separate actuating means for the two clutches;

Fig. 6 shows a similar arrangement dependent upon conditions arising from changes in flying altitude and Fig. 7 shows the actuating devices coupled together for manual operation in succession.

Figure 1:
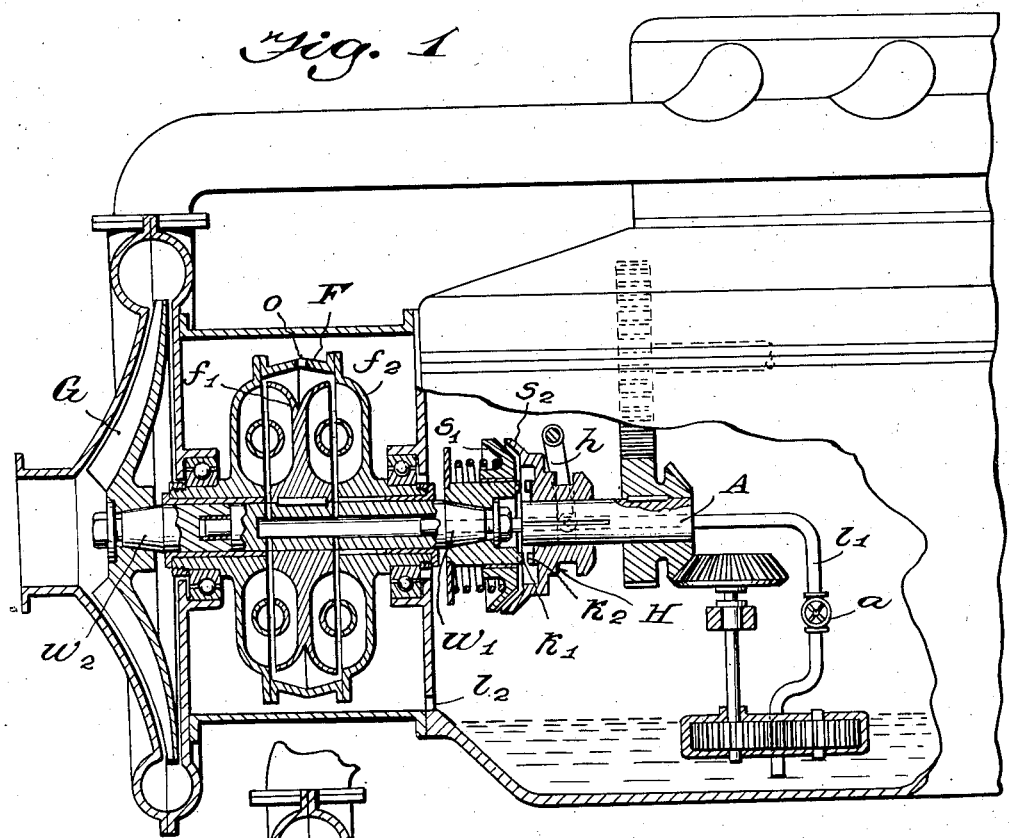
Figure 1 is a longitudinal section of a blower, a liquid clutch and an auxiliary claw clutch.

Referring to Figure 1, the driving shaft A may be a shaft driven through a step-up transmission from the engine shaft. F indicates the liquid clutch for transmitting the drive to a blower G, and H is an auxiliary clutch between the shaft A and the liquid clutch. The auxiliary clutch H comprises dogs $k_1$, $k_2$ which can be engaged by a clutch lever $h$ but, advantageously, only after a synchronizing device has been brought into operation for the purpose of giving the clutch part carrying the dogs $k_1$ the same speed as the clutch part feathered on the shaft A and carrying the dogs $k_2$. In the example illustrated, the synchronising device consists of friction clutch elements $s_1$, $s_2$. As will be seen from the drawings, the friction clutch element $s_1$ is axially slidable against the resistance of a spring on the clutch part which carries the dogs $k_1$ and is fixed on the end of an intermediate shaft $w_1$. The friction element $s_2$ forms an extension of the slidable clutch part carrying the dogs $k_2$. Upon moving the lever $h$ and slidable clutch part to the left in Figure 1, the friction element $s_2$ is engaged with $s_1$ so that the drive of the shaft A is transmitted to the shaft $w_1$ and the latter soon acquires substantially the speed of the shaft A. Only then, and by operating the lever $h$ against the resistance of the spring, is the friction element $s_1$ forced back to permit engagement of the dogs $k_2$, $k_1$.

The shaft $w_1$ has keyed to it the inner part $f_1$ of the liquid clutch F, the outer parts $f_2$ of such clutch being united with a housing which runs in suitable bearings and is united with the blower shaft $w_2$. The liquid clutch illustrated is of the double type comprising two liquid circulations of opposite direction for giving axial balance.

Figure 2:
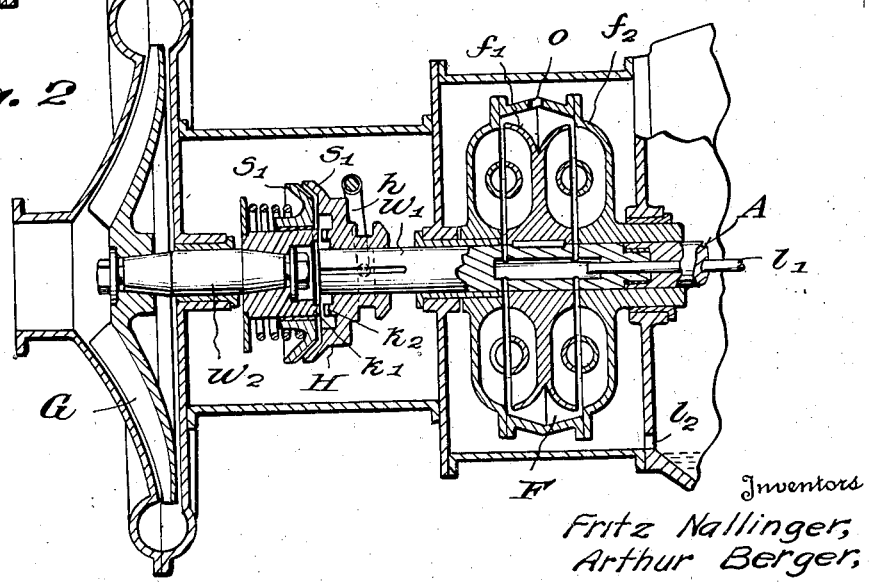
Figure 2 is a similar view, but it shows the auxiliary claw clutch interposed between the blower and the liquid clutch.

In the arrangement illustrated in Figure 2, the auxiliary clutch is between the liquid clutch and the blower. Thus, the inner part $f_1$ of the liquid clutch is keyed to the shaft A, the housing including the parts $f_2$ is united with the intermediate shaft $w_1$, the slidable half of the auxiliary clutch is feathered on the shaft $w_1$, and the other half of the auxiliary clutch is fixed on the blower shaft $w_2$.

Referring again to Figure 1, the liquid clutch F is of the kind which is fully operative when charged with liquid and runs idle when emptied. The liquid charge is supplied to the clutch by a pipe $l_1$ under control of a cock $a$. The pipe $l_1$ is passed through a bore in the shaft A and enters a bore of the shaft $w_1$ through jointing means seen thereon. The liquid delivered to the bore of the shaft $w_1$ passes therefrom through radial passages seen in the drawings, and so into the cavities of the clutch. The flow of liquid is assisted, of course, by centrifugal action within the clutch, which action also assists discharge of liquid from the clutch through the restricted port $o$ in the peripheral wall of the clutch. The liquid so discharged returns, by way of a drain opening $l_2$ on the fixed casing, to the suction of the forcing means supplying the pipe $l_1$. There is thus a constant circulation through the liquid clutch during its operative periods. When the cock $a$ is closed, or when the liquid supply is otherwise cut off, the clutch will empty itself of liquid and run idly.

In Figure 2, the supply pipe $l_1$ passes through a bore of the hollow shaft A and opens into an enlargement of such bore, the radial passages for serving the clutch cavities being seen opening out of that enlargement.

The operation is as follows:

When the clutch F is empty and the auxiliary clutch is disengaged, the blower G is at rest although the driving shaft A may be revolving at a high speed, for example 25,000 revolutions per minute.

In order to drive the blower in Figure 1, the auxiliary clutch H is engaged by swinging the lever $h$ to the left. This immediately brings the friction elements or synchronisers $s_2$, $s_1$ into engagement for the starting and speeding up of the shaft $w_1$ until it attains the speed of the shaft A or thereabouts. Since the moment of inertia of the parts to be accelerated is kept as small as possible, rapid and effective synchronisation is possible. It is with this object that the smaller mass of the inner clutch part $f_1$ is keyed to the shaft $w_1$ and not the greater mass of the outer part $f_2$. When the shafts A and $w_1$ have about the same speed, the dogs $k_2$, $k_1$ can be brought into engagement without shock in the manner already described.

With increasing speed of the rotor $f_1$, there arises at the same time an increasing air friction in the empty liquid clutch which, although with considerable slip, entrains the rotor part $f_2$, the shaft $w_2$ and the blower G at idle running speeds (for example 5,000 revolutions per minute). At this time or immediately thereafter, the liquid clutch is refilled with liquid by opening the cock $a$, until the blower works with full output at maximum speed. As a rule, therefore, the idle running of the blower driven by the liquid clutch rotating with maximum slippage is at most a transitory condition of operation, so that the disadvantages of such idle running cannot persist.

In the arrangement in Figure 2, the process of operation is in itself the same, in that firstly the auxiliary clutch H is engaged and thereafter the liquid clutch F is filled. However, the manner of operation differs from that of Figure 1 for in this case the liquid clutch constantly rotates together with the driving shaft A. Nevertheless, the disengagement of the blower G by the auxiliary clutch H has the effect that the liquid clutch F does practically no work, since the parts $w_1$, $k_1$, $s_1$ connected to the rotor part $f_1$ offer practically no resistance to entrainment by the air friction in the liquid clutch. The shaft $w_1$ will therefore run idly without appreciable slip approximately at the same speed as the driving shaft A.

Upon engagement of the auxiliary clutch H, the stationary blower G will first effect braking of the shaft $w_1$ or of the rotor part $f_1$, so that an increasing air friction and slippage is produced in the empty liquid clutch. Consequently, a partial transmission of power (idle-running output at, for example, 5,000 revolutions per minute) to the blower through the liquid clutch is effected. As a rule, however, the liquid clutch is at this moment or immediately thereafter, refilled with liquid until the blower again works at full load and speed.

The actuation of the auxiliary clutch H and the emptying or control of the liquid clutch F may be effected by separate actuating means (for example $h$ and $a$ in Fig. 5) at will by the operator or also automatically (in the case of aircraft, for example in Fig. 6, in dependence upon the flying altitude). However, the actuating devices may also be coupled together, for example in such fashion that firstly the lever $h$ (for engaging the auxiliary clutch H) and thereafter the cut-off cock $a$ (for filling the liquid clutch F) are adjusted as shown in Fig. 7 by a common lever R and linkage. In view of the fact, however, that the filling of the liquid clutch requires a certain period of time, the two actuating devices ($h$ and $a$) may also be adjusted simultaneously or the cut-off member such as $a$ may even be adjusted before the lever $h$ or other appropriate device so long as the liquid charge is appropriately timed. Upon putting the blower (or other machine) out of operation, preferably the liquid clutch should first be emptied and thereafter the auxiliary clutch disengaged.

Figure 3:
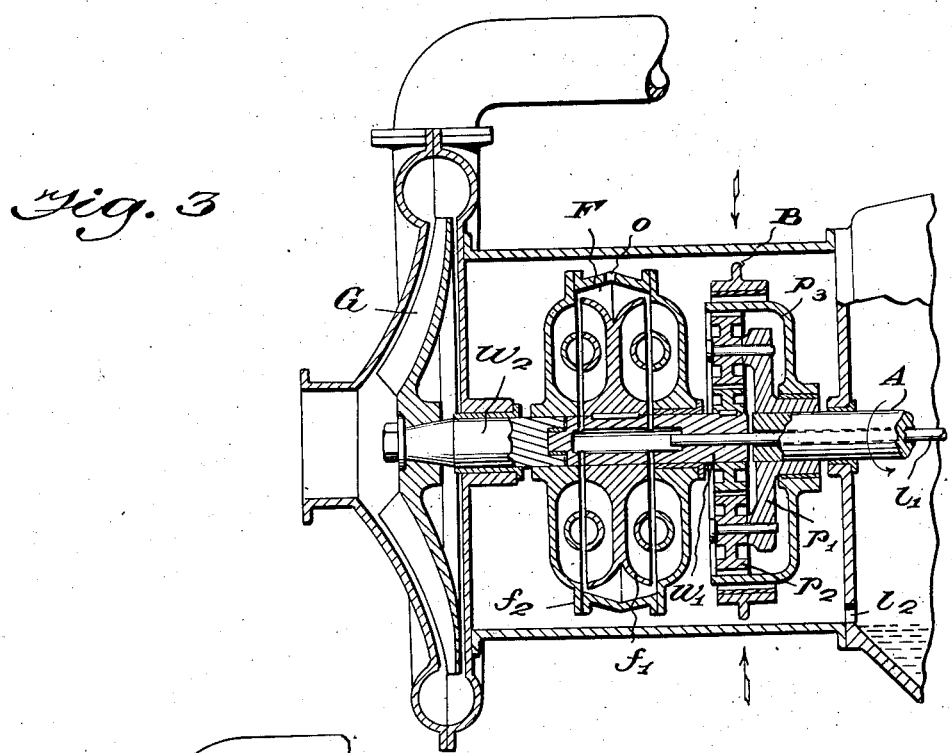
Figure 3 is also a similar view, but it shows a brake-controlled planetary gear as the equivalent of an auxiliary clutch.

In accordance with Figure 3, the driving shaft A drives the clutch part $f_1$ by way of a planetary gearing P and the shaft $w_1$, the blower G being connected with the outer clutch part $f_2$. The planetary gearing P consists of a planet carrier $p_1$ upon which planet wheels $p_2$ are mounted. These mesh on the one hand with the internal ring of teeth in the drum $p_3$ and on the other hand with the sun wheel $p_4$ keyed on the shaft $w_1$. The drum $p_2$ is revolubly mounted but can be braked and held fast by a brake B.

With the blower disconnected, the liquid clutch F is emptied and the brake B is released. The shaft A rotates together with the planet carrier $p_1$ without torque being transmitted to the shaft $w_1$. The sun wheel $p_4$ then remains substantially stationary, the planet wheels $p_2$ rolling upon it and carrying the drum $p_3$ along.

For driving the blower, the brake B is tightened so that the drum $p_3$ is brought to rest more or less rapidly. By this means, the gear wheel $p_4$ and, therewith, the shaft $w_1$ and clutch half $f_1$ are gradually accelerated, this moreover, in accordance with the transmission ratio provided in the planetary gearing, up to an appropriate high speed (preferably higher than the speed of the shaft A). At the same time or immediately thereafter, the filling of the clutch F with liquid is effected by admitting liquid to the pipe $l_1$ which passes through bores in the shafts A and $w_1$ and opens into an enlargement of the second bore as seen in Figure 3.

Disconnection of the blower is effected fundamentally in the converse order.

Figure 4:
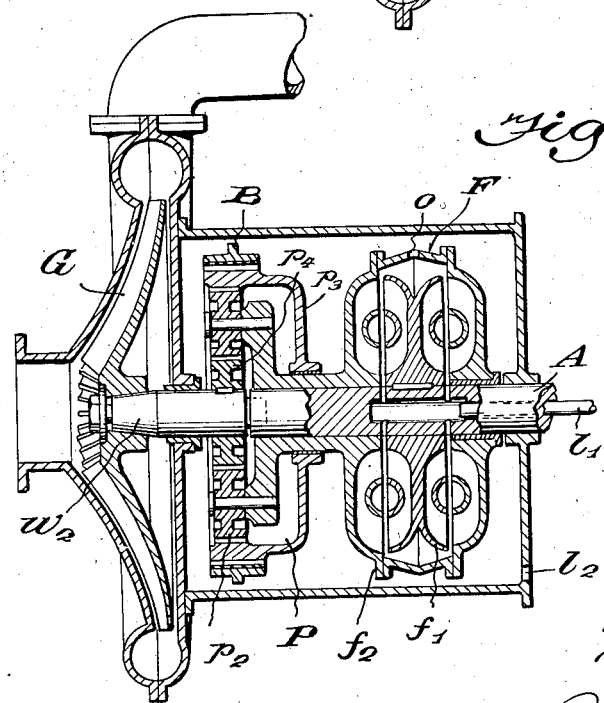
Fig. 4 is an arrangement of the planetary gear interposed between the liquid clutch and the blower.

The planetary gearing may in some cases be disposed, similarly to the arrangement in Figure 2, between the liquid clutch and the blower (see Fig. 4). Furthermore, in place of a planetary gearing proper, use may be made of a differential gearing or a correspondingly acting gear arrangement.

What we claim is:

1. In combination, a load, a liquid clutch composed of two operating elements having a working circuit therebetween, one of said elements being connected to said load, a source of power, means comprising planetary gearing for connecting the other element of said clutch to said source of power, and means for varying the power transmitted by said planetary gearing, said planetary gearing including a step-up gearing between the source of power and the liquid clutch element.

2. In combination, a load, a liquid clutch composed of two operative elements having a working circuit therebetween, one of said elements being connected to said load, a source of power, a progressively acting mechanical power transmitting device connecting the other element of said clutch to said source of power, and common means for simultaneously initiating control of said liquid clutch and said device.

3. In combination, a load, a liquid clutch composed of two operative elements having a working circuit therebetween, one of said elements being connected to said load, a source of power, a progressively acting mechanical power transmitting device connecting the other element of said clutch to said source of power, and common means for initiating control of said liquid clutch and said device, said means being so arranged as to initiate the control of said device before control of said liquid clutch.

4. In combination, a load, a liquid clutch composed of two operative elements having a working circuit therebetween, one of said elements being connected to said load, a source of power, and a progressively acting mechanical power transmitting device connecting the other element of said clutch to said source of power, said element of the liquid clutch connected to the load having a higher moment of inertia than said element connected to the source of power through said device.

5. In combination, a load, a source of power, a fluid clutch and a mechanical clutch serially connected between said load and said source of power, means for filling and emptying said liquid clutch, means for coupling and uncoupling said mechanical clutch, and means for controlling the liquid clutch filling and emptying means and the mechanical clutch coupling and uncoupling means in such a manner that when connecting the load to the source of power said mechanical clutch is engaged and thereafter said liquid clutch is filled.

6. In combination, a load, a source of power, a fluid clutch and a mechanical clutch serially connected between said load and said source of power, means for filling and emptying said liquid clutch, means for coupling and uncoupling said mechanical clutch, and means for controlling the liquid clutch filling and emptying means and the mechanical clutch coupling and uncoupling means in such a manner that simultaneously with engagement of said mechanical clutch filling of said liquid clutch is initiated.

FRITZ NALLINGER.
ARTHUR BERGER.